Nov. 3, 1925.   1,560,325
R. E. ROY
TRACTOR
Original Filed Oct. 12, 1921   3 Sheets-Sheet 1

WITNESS:
Benj. Kahn.

INVENTOR
BY Robert Earl Roy.
ATTORNEY.

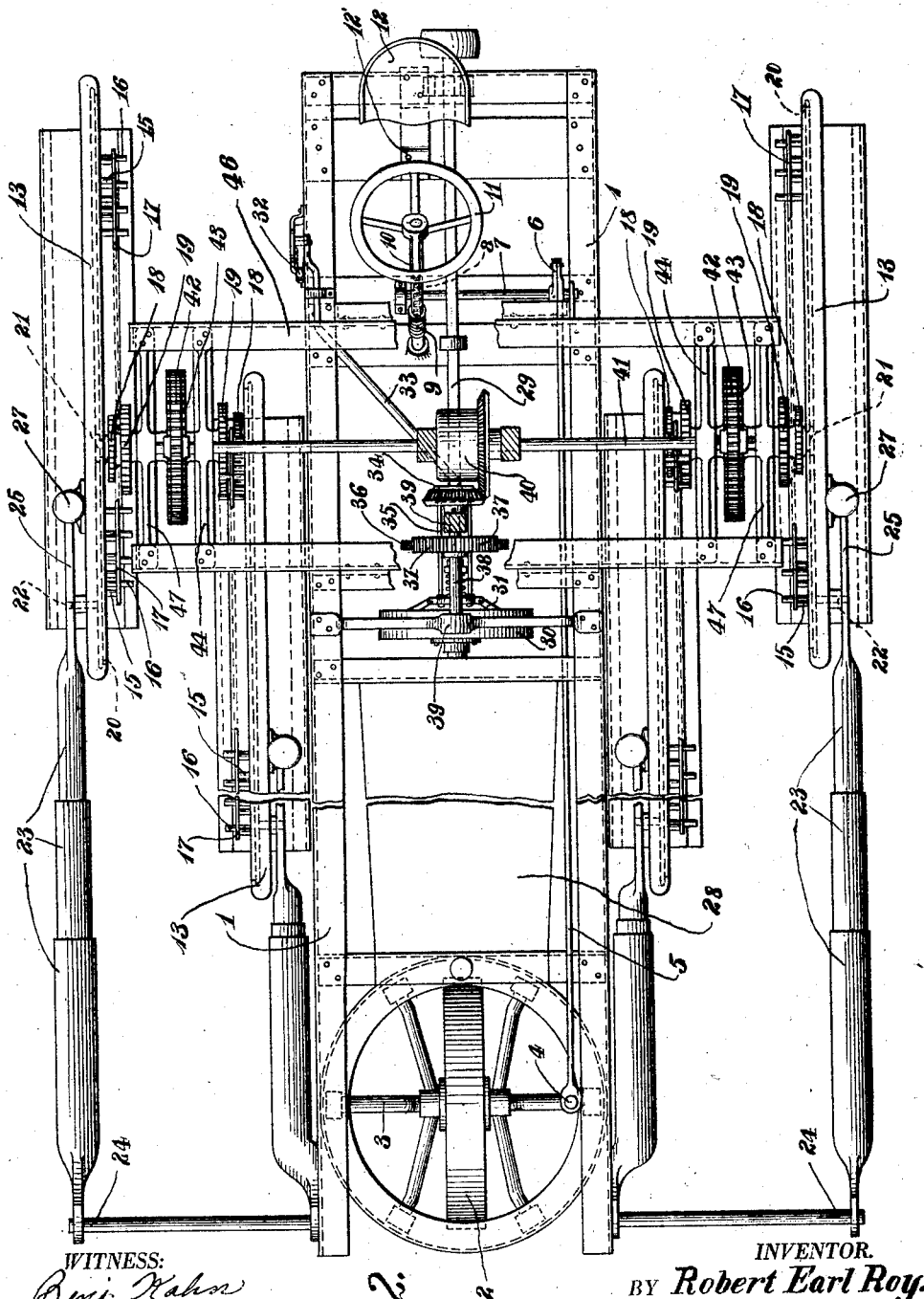

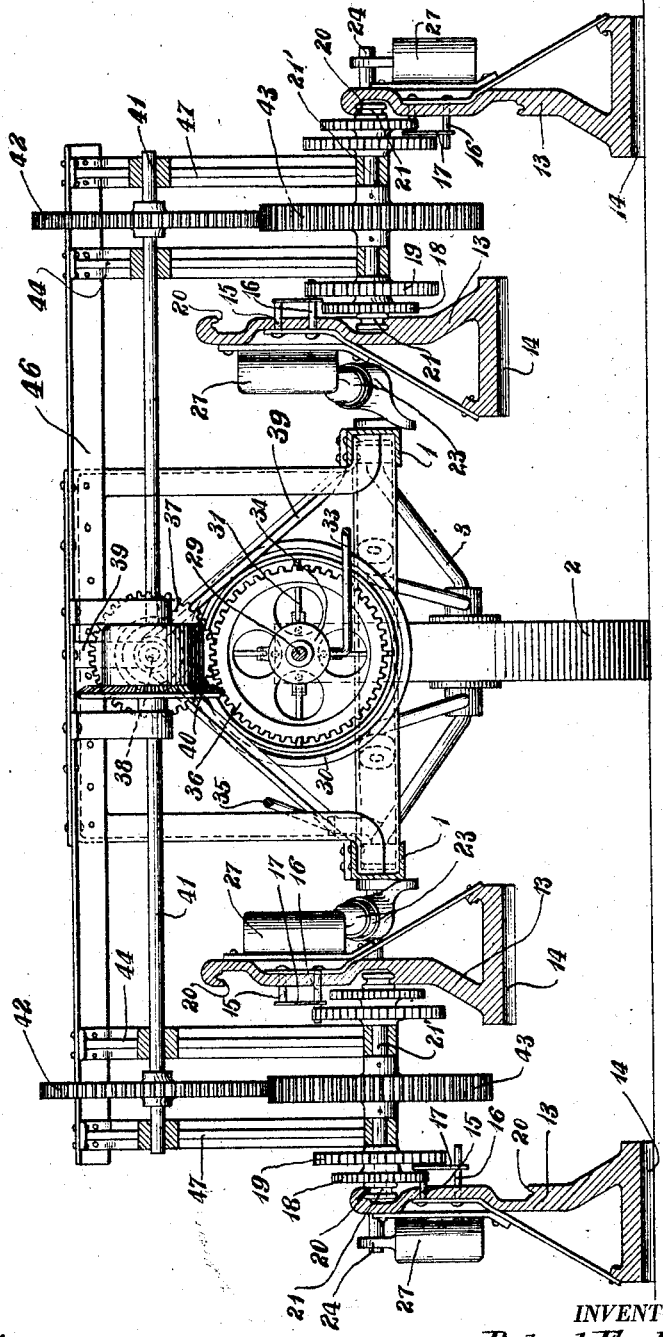

Patented Nov. 3, 1925.

1,560,325

UNITED STATES PATENT OFFICE.

ROBERT E. ROY, OF OAKLAND, CALIFORNIA.

TRACTOR.

Continuation of abandoned application Serial No. 507,358, filed October 12, 1921. This application filed November 22, 1924. Serial No. 751,710.

*To all whom it may concern:*

Be it known that I, ROBERT E. ROY, a citizen of the United States, residing at Oakland, county of Alameda, and State of California, have invented new and useful Improvements in Tractors, of which the following is a specification.

This invention relates to tractors especially adapted for farm use for plowing, cultivating, harrowing and other farm purposes, the object in view being to provide a practical tractor embodying a novel arrangement of treading steppers which form a traction means and also a support for a part of the frame of the tractor and serve to propel the machine during the operation in the field as well as when the machine is proceeding to and from the field of operation.

The chief feature of the invention resides in the traction means and in the particular formation mounting operation and arrangement of the treading steppers whereby each stepper is driven rearwardly during its working or traction stroke at a predetermined speed and is returned or driven forward to the initial point of its working speed at a relatively accelerated speed, thereby compensating for the time that would otherwise be lost in the elevation and depression of each treading stepper during the complete orbit of movement thereof. Furthermore, each stepper moving forwardly to its initial point of operation starts upon its working stroke before the companion stepper operating in rear thereof leaves the ground so that the frame is supported at opposite sides by at least one stepper all of the time. This causes the machine to travel forwardly with the frame at uniform level, preventing any jarring action or vibration due to irregular operation of the steppers.

With the above and other objects in view, the invention consists in the novel construction, combination and arrangement herein fully described, illustrated and claimed.

In the accompanying drawing:

Figure 2 is a plan view of the same.

Figure 3 is a vertical transverse section through the machine taken in rear of the differential gearing and the mechanism for driving the treading steppers.

Figure 1:
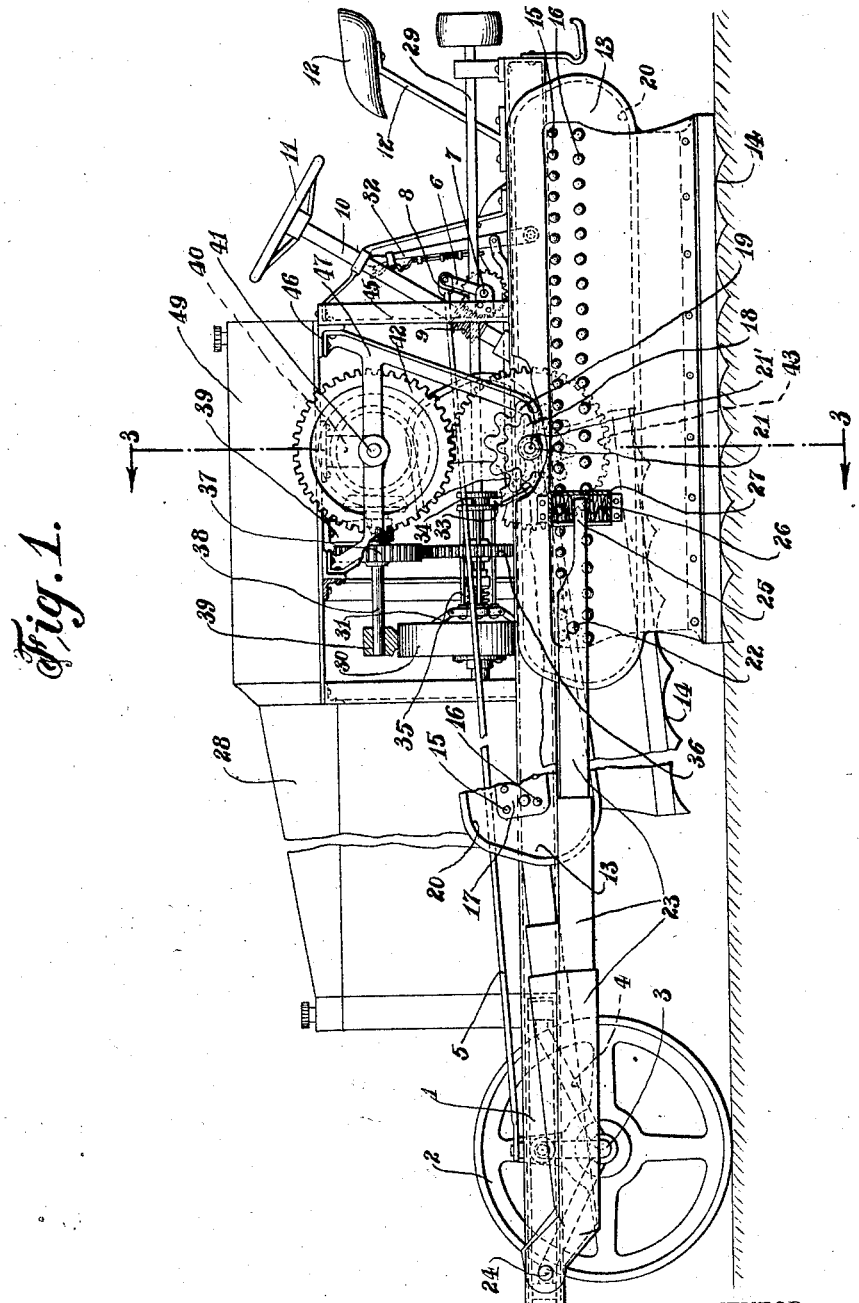
Figure 1 is a side elevation of the tractor with parts broken away in section to better illustrate the construction and operation of certain parts.

The improved tractor comprises a main frame 1 embodying longitudinal and transverse frame members as shown in the drawing, said frame being supported at one end, preferably the forward end thereof by means of a rolling support 2 shown in the form of a steering wheel mounted to turn on a substantially vertical axis or spindle 3 and having connected to the bearings thereof oppositely extending steering arms 4 from which a steering rod 5 extends rearwardly to an arm 6 extending upwardly from the shaft 7 of a worm gear 8 which meshes with and is actuated by a worm 9 on the shaft of a steering column 10 having the usual hand-wheel 11 such as is used in ordinary tractor practice. The driver's seat 12 is supported upon a standard 12' at the rear of the machine and within convenient reach of the wheel 11.

The rear portion of the frame 1 is supported by a plurality of sets of treading steppers 13 each of which has a bottom traction face 14 of any suitable formation such as spurs or ribs. As illustrated in the drawing, two sets of treading steppers 13 are employed and there are two steppers in each set, one set being located at each side of the longitudinal axis of the machine. The steppers operate alternately or one after the other so that while one stepper is being driven rearwardly, to drive the machine ahead, the companion stepper is being carried forwardly at a relatively accelerated speed to take the place of the working stepper when the latter reaches the rearward limit of its movement and moves upwardly out of contact with the surface of the ground.

Each treading stepper 13 is provided along the normally horizontal upper edge or top thereof with upper and lower series 15 and 16 of teeth. The teeth 15 and 16 which are shown in the form of bolts or pins extending through parallel plates 17 are arranged in superimposed parallel but spaced series, the teeth 15 being arranged closer together than the teeth 16 for a purpose which will presently appear. In working conjunction with each treading stepper, I provide two square pinions or gears 18 and 19, the gear 18 being smaller than the gear 19. The gear 18 is the gear which meshes with the teeth 15 and is used for driving the respective treading stepper rearwardly during the traction stroke. The larger gear 19 is designed to engage the teeth 16 of the stepper for the purpose of driving the stepper forwardly at a relatively accelerated speed in the return movement thereof. It will be observed that the teeth at the lower portion of the gear 18 mesh with the upper teeth 15 of the stepper 13 while the upper teeth of the gear 19 mesh with the lower teeth 16 of said stepper during the return movement of the latter. As the gear 19 is of greater diameter and number of teeth than the gear 18, it will be seen that the advance movement of the treading stepper is accelerated with respect to the rearward or traction movement of said stepper, thereby compensating for the time that would otherwise be lost in the elevation and depression operation of the stepper at the opposite ends of the movement thereof.

In order to guide the steppers in their back and forth movement and maintain the rack faces thereof in engagement with the respective gears 18 and 19, each treading stepper 13 is provided with an endless guide or track 20 of oblong formation with rounded end portions as shown in the drawings, said track moving in contact with the spindle or shaft 21 on which the gears 18 and 19 are mounted. The co-operation of the parts just referred to is illustrated in Figure 3 so that the gears 18 and 19 are constantly held in mesh with the teeth of the respective stepper 13. By reason of the construction described, the forwardly moving stepper reaches the limit of its forward movement and is depressed and brought into supporting engagement with the surface of the ground before the rearwardly moving stepper has reached the limit of its rearward movement and before it starts upwardly toward its return stroke path. This insures the support of the rear portion of the frame at both sides of the longitudinal surfaces of the machine at all times, causing the frame 1 to travel along in a uniformly horizontal path.

Each of the treading steppers 13 is connected adjacent its forward end at the point 22 to a longitudinally extensible carrying arm 23 shown as comprising a plurality of telescopic sections which enable said arm to lengthen and shorten automatically. The arm 23 is journaled at its forward end as shown at 24 on the frame 1 to admit of the up and down as well as the back and forth movement of the respective treading steppers 13. Each arm 23 carries a rearwardly extending heel portion 25 which is received between upper and lower cushioning springs 26 carried by a supporting bracket 27 fastened to the adjacent treading stepper. This permits the respective treading stepper to have a slight rocking movement on a transverse axis in order that it may accommodate itself to irregularities in the surface of the ground being traveled over.

Mounted upon the frame of the machine and concealed under the usual hood 28 is an internal combustion engine having a rearwardly extending shaft 29 upon which is mounted the usual fly wheel 30 which contains and co-operates with a clutch 31 adapted to be thrown into and out of operation by means of a clutch operating lever 32 arranged within reach of the driver in his seat 12 on the machine, the lever 32 having attached thereto forwardly extending rods 33 which are connected to a fork 34 from which rods 35 extend through the spider of a gear 36 and connected to the clutch 31. The gear 36 is driven at the same speed as the engine shaft 29 or may be driven at different ratios of speed by providing differential speed transmission gearing of the type now used in automobile or motor truck practice.

Arranged above the gear 36 and driven thereby is another gear 37, the shaft 38 of which is journaled in bearings 39, said shaft 38 extending rearwardly to an operating differential gearing 40 arranged centrally of a transversely extending driving axle 41 having fast on the opposite ends thereof gears 42. The gears 42 mesh with underlying gears 43 on the transversely opposite spindles or shaft 21 of the gears 18 and 19 above referred to, thereby imparting motion to both sets of treading steppers as clearly shown in Figure 3. The spindles or axles 21 are journaled in bearings at the lower ends of yokes 44 and 47 at each side of the machine and these yokes are secured to and depend from cross-bars 46 which are bolted transversely of the frame. Thus a thorough bracing action is obtained between the main frame of the machine and the spindles 21 carrying the gears which actuate the treading steppers in their back and forth movement. 49 designates the gasoline or fuel tank mounted above the gearing hereinabove described and in rear of the engine under the hood 28, said tank 49 being connected with the carbureter of the engine by the usual fuel feed pipe.

From the foregoing description taken in connection with the accompanying drawing, the operation of the tractor will now be understood. The forward portion of the main frame of the machine is supported by the steering wheel 2 and the rear portion of the frame together with the load carried thereon is supported by the two transversely opposite sets of treading steppers 13 which are driven in the manner hereinabove described so that there will be at least one stepper on each side of the longitudinal axis of the machine in supporting and traction engagement with the ground, each stepper being moved forwardly to the initial point of its working stroke at an accelerated rate of speed as compared with the speed of the working stroke thereof. It will further be seen that the forwardly moving stepper reaches the forward limit of its movement and is depressed into supporting contact with the ground before the rearwardly moving stepper reaches the rear limit of its working stroke and starts upon its elevating operation. At no time is the traction face 14 of any stepper above the gearing for driving the same and this prevents the dumping of dirt, earth or trash upon the working parts of the driving mechanism. This is a very important feature of the tractor as it greatly prolongs the life and efficiency of the same. The differential gearing provides for turning the end of the ferrule and in steering the machine under power from place to place.

Having thus described my invention, what I claim and desire to secure by Letters Patent is—

1. A tractor embodying in combination, a frame, a rolling support adjacent to one end of said frame, two sets of treading steppers forming other supporting means for said frame and arranged at opposite sides of the central fore and aft axis thereof, an engine on said frame, and driving connections between said engine and steppers operating to drive a stepper of each set rearwardly at a certain speed and forwardly at a relatively accelerated speed, said driving connections including two sets of rack faces on each stepper, and two driving spur gears of different sizes meshing therewith.

2. A tractor embodying in combination, a frame, a rolling support adjacent to one end of said frame, two sets of treading steppers forming other supporting means for said frame and arranged at opposite sides of the central fore and aft axis thereof, an engine on said frame, and driving connections between said engine and steppers operating to drive a stepper of each set rearwardly at a certain speed and forwardly at a relatively accelerated speed, said driving connections including two sets of rack faces on each stepper, and two driving spur gears of different sizes meshing therewith, the major portions of said rack faces being in spaced parallel relation to each other.

3. A tractor embodying in combination, a frame, a rolling support adjacent to one end of said frame, two sets of treading steppers forming other supporting means for said frame and arranged at opposite sides of the central fore and aft axis thereof, an engine on said frame, and driving connections between said engine and steppers operating to drive a stepper of each set rearwardly at a certain speed and forwardly at a relatively accelerated speed, and longitudinally extensible arms pivotally attached to the frame and having said steppers secured thereto.

4. A tractor embodying in combination, a frame, a rolling support adjacent to one end of said frame, two sets of treading steppers forming other supporting means for said frame and arranged at opposite sides of the central fore and aft axis thereof, an engine on said frame, and driving connections between said engine and steppers operating to drive a stepper of each set rearwardly at a certain speed and forwardly at a relatively accelerated speed, and longitudinally extensible arms pivotally attached to the frame and having said steppers secured thereto, by flexible means permitting said steppers to rock on transverse axis.

5. In a tractor of the character described a pair of steppers alternately engageable with the ground, a pair of horizontally disposed, superposed, parallel, interspaced rack members on each stepper, a continuously driven shaft, a pair of gears secured on the shaft, one of said gears being larger in diameter than the other, one of said gears engaging the uppermost rack bar when the steppers are in engagement with the ground, and the other of said gears engaging the lower rack member when the steppers are out of engagement with the ground, and guide means for maintaining the gears in engagement with their respective rack members.

6. In a tractor of the character described a pair of steppers alternately engageable with the ground, a pair of horizontal, parallel rack members on each stepper, said rack members being disposed one above the other, a continuously driven shaft, a pair of gears on said shaft, one larger than the other, the larger gear engaging one rack member during return movement of a stepper, and the smaller gear engaging the other rack member when a stepper engages the ground, and means for maintaining the gears in engagement with their respective rack members during predetermined positions of the steppers.

7. In a tractor of the character described a pair of steppers alternately engageable with the ground, a pair of horizontal, parallel rack members on each stepper, said rack members being disposed one above the other, a continuously driven shaft, a pair of gears on said shaft, one larger than the other, the larger gear engaging one rack member during return movement of a stepper, and the smaller gear engaging the other rack member when a stepper engages the ground, a pair of guide rollers on the shaft, and an endless guide track for each stepper with which said rollers engage to guide the rack members into engagement with their respective gears, and to maintain the gears and racks in mesh when in engagement.

8. In a tractor of the character described a pair of steppers alternately engageable with the ground, a pair of horizontal, parallel rack members on each stepper, said rack members being disposed one above the other and being offset laterally in a vertical plane with relation to each other, a continuously driven shaft, a pair of gears on said shaft, one larger than the other and each gear aligning with a cooperating rack member, the larger gear engaging its rack member during return movement of a stepper, and the smaller gear engaging its cooperating rack member when a stepper engages the ground, and means for maintaining the gears in engagement with their respective rack members during predetermined positions of the steppers.

ROBERT E. ROY.